United States Patent
Kwon et al.

(10) Patent No.: US 8,032,842 B2
(45) Date of Patent: Oct. 4, 2011

(54) SYSTEM AND METHOD FOR THREE-DIMENSIONAL INTERACTION BASED ON GAZE AND SYSTEM AND METHOD FOR TRACKING THREE-DIMENSIONAL GAZE

(75) Inventors: Yong-Moo Kwon, Seoul (KR); Sung Kyu Kim, Seoul (KR); Kyeong Won Jeon, Seoul (KR); Jeong Seok Ki, Gwangyang-si (KR); Sang Woo Jo, Seoul (KR)

(73) Assignee: Korea Institute of Science & Technology, Seoul (KR)

( * ) Notice: Subject to any disclaimer, the term of this patent is extended or adjusted under 35 U.S.C. 154(b) by 872 days.

(21) Appl. No.: 11/881,238

(22) Filed: Jul. 25, 2007

(65) Prior Publication Data

US 2008/0181452 A1 Jul. 31, 2008

(30) Foreign Application Priority Data

Jul. 25, 2006 (KR) .................. 10-2006-0069988

(51) Int. Cl.
*G06F 3/048* (2006.01)
*G06F 3/00* (2006.01)
(52) U.S. Cl. ......... 715/850; 715/863; 351/209; 382/103
(58) Field of Classification Search .................. 715/769, 715/841, 850, 863; 351/209, 237, 246, 211, 351/224; 382/103, 118, 167
See application file for complete search history.

(56) References Cited

U.S. PATENT DOCUMENTS

| | | | |
|---|---|---|---|
| 5,309,185 A * | 5/1994 | Harper ........................... | 351/202 |
| 5,500,671 A * | 3/1996 | Andersson et al. .......... | 348/14.1 |
| 5,550,602 A * | 8/1996 | Braeuning .................... | 351/243 |
| 5,933,210 A * | 8/1999 | Ron ............................... | 351/246 |
| 5,963,300 A * | 10/1999 | Horwitz ........................ | 351/209 |
| 6,393,136 B1 * | 5/2002 | Amir et al. .................... | 382/103 |
| 6,456,262 B1 | 9/2002 | Bell | |
| 7,245,273 B2 * | 7/2007 | Eberl et al. ........................ | 345/7 |
| 7,267,439 B2 * | 9/2007 | Toshima et al. ............... | 351/223 |
| 7,306,337 B2 * | 12/2007 | Ji et al. .......................... | 351/209 |
| 7,309,128 B2 * | 12/2007 | Cappo et al. .................. | 351/224 |
| 7,809,160 B2 * | 10/2010 | Vertegaal et al. ............. | 382/103 |
| 2002/0101568 A1* | 8/2002 | Eberl et al. .................... | 351/211 |
| 2004/0057013 A1* | 3/2004 | Cappo et al. .................. | 351/224 |
| 2004/0174496 A1* | 9/2004 | Ji et al. .......................... | 351/209 |
| 2005/0105044 A1* | 5/2005 | Warden et al. ................ | 351/159 |
| 2005/0175218 A1* | 8/2005 | Vertegaal et al. ............. | 382/103 |
| 2005/0206583 A1* | 9/2005 | Lemelson et al. ................ | 345/7 |
| 2006/0028400 A1* | 2/2006 | Lapstun et al. .................... | 345/8 |
| 2006/0110008 A1* | 5/2006 | Vertegaal et al. ............. | 382/103 |
| 2007/0060390 A1* | 3/2007 | Wells .............................. | 463/46 |

FOREIGN PATENT DOCUMENTS

| | | |
|---|---|---|
| JP | 10-091325 | 4/1998 |
| JP | 2004188017 A | 7/2004 |
| KR | 10-2002005965 A | 7/2002 |
| KR | 10-2004-00277 64 A | 4/2004 |
| KR | 10-0820639 B1 | 4/2008 |
| WO | WO 01/33282 A1 | 5/2001 |

* cited by examiner

*Primary Examiner* — Nicholas Augustine
(74) *Attorney, Agent, or Firm* — NSIP Law, PC

(57) ABSTRACT

A gaze-based three-dimensional (3D) interaction system and method, as well as a 3D gaze tracking system and method, are disclosed. The gaze direction is determined by using the image of one eye of the operator who gazes at a 3D image, while the gaze depth is determined by the distance between pupil centers from both eyes of the operator shown in an image of both eyes of the operator.

12 Claims, 26 Drawing Sheets

FIG. 27

| | user 1 | user 2 |
|---|---|---|
| $C(=X_c)$ (840) | 3~23 | 3~23 |
| $C(=X_c)$ (2600) | 9~15 | 9~16 |
| $h(=y_n)$ (840) | 8~22 | 8~23 |
| $h(=y_n)$ (2600) | 14~18 | 13~18 |
| PCD (840) | 756~758 | 763~764 |
| PCD (2600) | 762 | 767 |

| Index | depth(mm) | PCD(pixel) |
|---|---|---|
| 1 | 500 | 750~752 |
| 2 | 630 | 753~755 |
| 3 | 840 | 756~758 |
| 4 | 1270 | 759 |
| 5 | 2600 | 762 |

| Index | depth(mm) | PCD(pixel) |
|---|---|---|
| 1 | 500 | 759~750 |
| 2 | 630 | 761~762 |
| 3 | 840 | 763~764 |
| 4 | 1270 | 765 |
| 5 | 2600 | 767 |

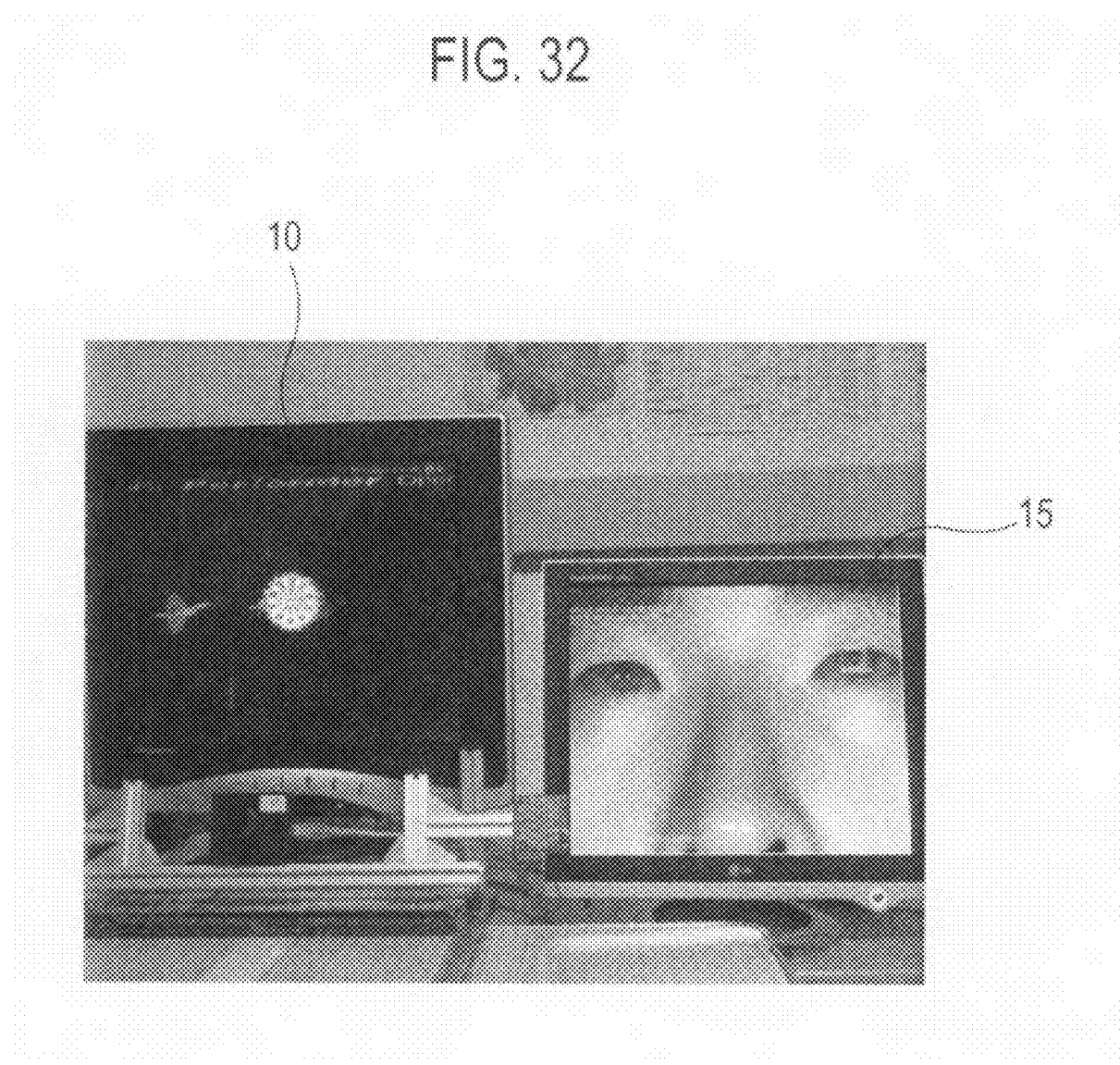

SYSTEM AND METHOD FOR THREE-DIMENSIONAL INTERACTION BASED ON GAZE AND SYSTEM AND METHOD FOR TRACKING THREE-DIMENSIONAL GAZE

The present application claims priority from Korean Patent Application No. 10-2006-69988 filed Jul. 25, 2006, the entire subject matter of which is incorporated herein by reference.

BACKGROUND OF THE INVENTION

1. Field of the Invention

The present invention relates to a system and method for three-dimensional interaction based on gaze. In particular, the present invention relates to a system and method of using the image of the user's eyes to search for the point on a three-dimensional display screen that the user gazes on.

2. Background of the Invention

The eye gaze tracking technique and eye gaze direction detecting technique have been in the spotlight for new user input in the field of human computer interaction (HCI) and have been developed to assist the disabled use a computer. A person's gaze reflects one's specific interests or changes in body conditions. There has been considerable research on developing attentive user interface (AUI) and safety systems for preventing drowsy driving by utilizing the gaze tracking technique.

Traditionally, a number of methods have been used for tracking one's gaze on a two dimensional screen. For example, an electrooculography (EOG) method can be used where an electrode is put near an eye to track the gaze. Other methods include: monitoring the brightness of a pupil which changes according to the position of the light source; monitoring the point to which the light source is reflected from the cornea; utilizing the phenomena occurring when light from the light source passes through the different layers of eye having different refraction; and the search coil method that utilizes contact lenses. In addition, information regarding a user's head movement, obtained by using a magnetic sensor, and information regarding the center points of the irises and the pupils, obtained by using a camera, have been traditionally used to understand the relationship between the head and eyes and track the gaze. Alternatively, analog methods have also been used to predict one's gaze by monitoring the light variation due to the change in position of a light receiving device and the gaze and utilizing the light receiving device which receives light from a light emitting device and light which is reflected from the eye.

The conventional two-dimensional gaze detection methods mentioned above required monitoring the gaze while the user's head is secured (because of the lack of information on the position of the user's head) or using a separate device for detecting the position of the user's head, and were also not as accurate due to the limitations of the two-dimensional technique. Furthermore, the conventional gaze tracking devices were not suitable for mass production and very expensive and, as a result, have only been used as an input apparatus for the disabled.

There have been reports of using a head tracker or a stereo camera to find the three-dimensional position of the actual user's and then extracting the three-dimensional gaze vector; however, this method has the disadvantage that the user cannot move his/her head freely. The conventional model-based three-dimensional interaction method, which tracks the user's gaze on the basis of feature points of the user's face and the eyes that have been extracted, does not require the attachment of a separate device for detecting interaction, and allows some movement of the head but has the disadvantage that the entire face of the user needs to be captured within the camera's field of view (FOV).

BRIEF DESCRIPTION OF THE DRAWINGS

The embodiments will be described in detail with reference to the following drawings:

FIG. 27 shows a table of PCD values at different depths obtained via interpolation using the PCD value obtained by calibration in accordance with an embodiment of the present invention;

FIG. 30 to 32 shows gaze-based three-dimensional interaction in accordance with an embodiment of the present invention.

DETAILED DESCRIPTION OF THE INVENTION

Figure 1:
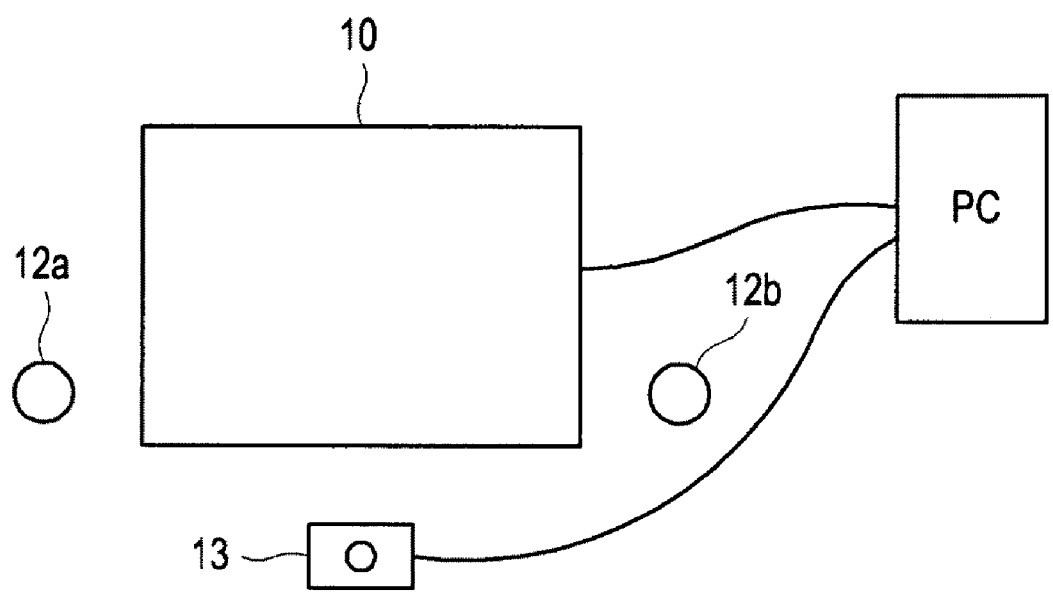
FIG. 1 is a schematic diagram of a gaze-based three-dimensional interaction system in accordance with the present invention.

The present invention provides a gaze-based three-dimensional (3D) interaction system and a 3D gaze tracking system, which are relatively simple to construct and affordable at a low cost. Specifically, the present invention provides a 3D image interaction system and a 3D gaze tracking system based on information regarding gaze direction and gaze depth obtained from an image of the two eyes of an operator.

In addition, the present invention provides an interaction method with a 3D image and a 3D tracking method by using information about the gaze direction and the gaze depth, which are obtained from an image of the operator.

Specifically, the present invention provides a gaze-based three-dimensional (3D) interaction system including: a display unit for displaying at least 3D images; two light sources aligned at both sides of said display unit; an image capturing unit for capturing an image of both eyes of an operator, wherein the image of both eyes of the operator comprises glints formed by said light sources and an image of two pupils in both eyes; a first signal processing unit for calculating gaze direction and gaze depth from the glints captured in said image capturing unit and the image of the two pupils in both eyes; a second signal processing unit for determining a gaze of the operator on said 3D image by the gaze direction and the gaze depth; and a third signal processing unit for performing a command of the operator according to the determined gaze.

The present invention also provides a gaze-based three-dimensional (3D) interaction method including: displaying a 3D image; providing a light on both eyes of an operator gazing said 3D image; capturing an image of both eyes of the operator, wherein the image of both eyes of the operator comprises glints formed by said light sources and an image of two pupils in both eyes; calculating gaze direction and gaze depth from the glints captured in said image capturing unit and the image of the two pupils in both eyes; determining a gaze of the operator on said 3D image by the gaze direction and the gaze depth; and performing a command of the operator according to the determined gaze.

In addition, the present invention provides a three-dimensional (3D) gaze tracking system, comprising: a display unit for displaying at least 3D images; two light sources aligned at both sides of said display unit; an image capturing unit for capturing an image of both eyes of an operator, wherein the image of both eyes of the operator comprises glints formed by the light sources and an image of two pupils in both eyes; a first signal processing unit for calculating gaze direction and gaze depth from the glints captured in said image capturing unit and the image of two pupils in both eyes; and a second signal processing unit for determining a gaze of the operator on said 3D image by the gaze direction and the gaze depth.

The present invention also provides a three-dimensional (3D) gaze tracking method, comprising: displaying a 3D image; providing a light on both eyes of an operator gazing said 3D image; capturing an image of both eyes of the operator, wherein the image of both eyes of the operator comprises glints formed by said light sources and an image of two pupils in both eyes; calculating gaze direction and gaze depth from the glints captured in said image capturing unit and the image of the two pupils in both eyes; and tracking a gaze of the operator on said 3D image by the gaze direction and the gaze depth.

The present invention provides a gaze-based 3D interaction system and method and a 3D gaze-tracking system and method that do not require the operator to wear glasses, where an object at an arbitrary position and depth on a 3D image can be selected and pointed by using only the gaze. In the present invention, interaction includes cursor movement and pointing on the monitor.

Figure 2:
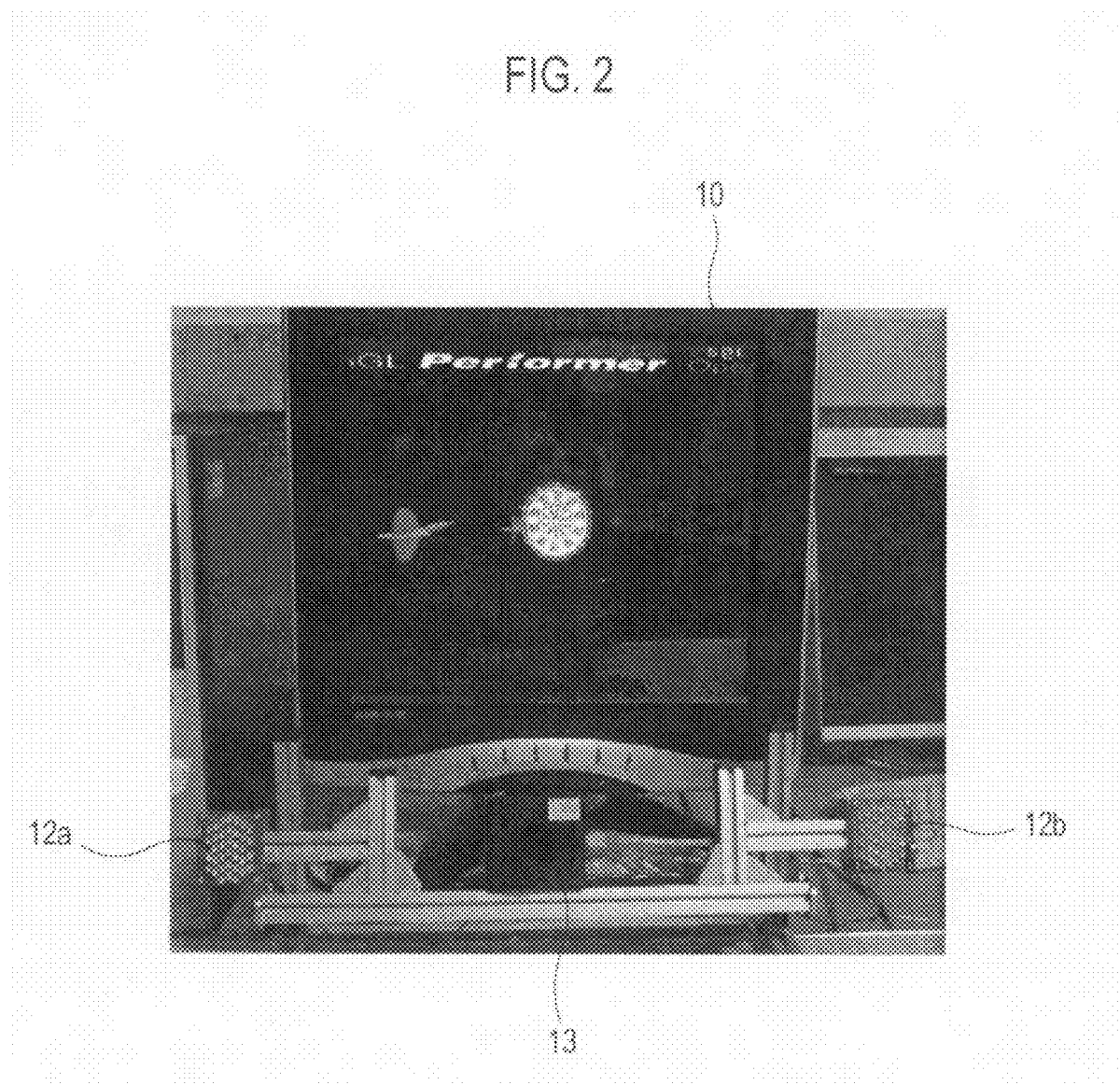
FIG. 2 is a photograph showing a system configured in accordance with an embodiment of the present invention.

As shown in FIGS. 1 and 2, the gaze-based 3D interaction system 100 according to the present invention includes a display unit 10, at least two light sources 12a and 12b, an image capturing unit (not shown) and a signal processing unit 13. The display unit 10 displays at least 3D images. The two light sources 12a and 12b are aligned at both sides of the display unit 10. The image capturing unit captures images comprising glints formed by the light sources 12a and 12b and images of two pupils in both eyes of the operator who gazes the 3D image. The signal processing unit 13 calculates the gaze direction and gaze depth from the glints captured in said image capturing unit and the image of the two pupils in both eyes. The signal processing unit also determines the gaze of the operator on the 3D image, based on the calculated gaze direction and gaze depth. The signal processing unit 13 also performs the command of the operator according to the determined gaze of the operator. The display unit 10 may be configured with a 3D monitor, and the signal processing unit 13 may be configured with various types of personal computers (PCs) or servers. Preferably, the light sources 12a and 12b are infrared light emitting diodes (LED) and the image capturing unit is a digital camera having an infrared filter attached thereto. The signal processing unit 13 may include a first signal processing unit for calculating the gaze direction and gaze depth, a second signal processing unit for determining the gaze and a third signal processing unit for performing the command of the operator according to the determined gaze. Preferably, the first signal processing unit calculates the gaze direction based on the positions of the two glints and the position of the pupil in each eye of the operator shown in an image, while it calculates the gaze depth from the distance between the two pupils of both eyes of the operator shown in the image. The second signal processing unit selects a region with the same gaze depth based on the distance between the two pupils obtained from the image of both eyes and then determines the spot which the operator gazes at within the selected region.

In the case where the signal processing unit 13 does not include the third signal processing unit, that is, where the signal processing unit 13 only includes the first signal processing unit for calculating the gaze direction and gaze depth and the second signal processing unit for determining the gaze, the gaze-based 3D interaction system 100 shown in FIG. 1 plays the role of a gaze tracking system. Except for the presence or absence of the third processing unit and performance of its function, the gaze-based 3D interaction system and method are identical to the gaze-based 3D tracking system and method, respectively. Therefore, the present specification will mainly focus on describing the gaze-based 3D interaction system and method.

Figure 3:
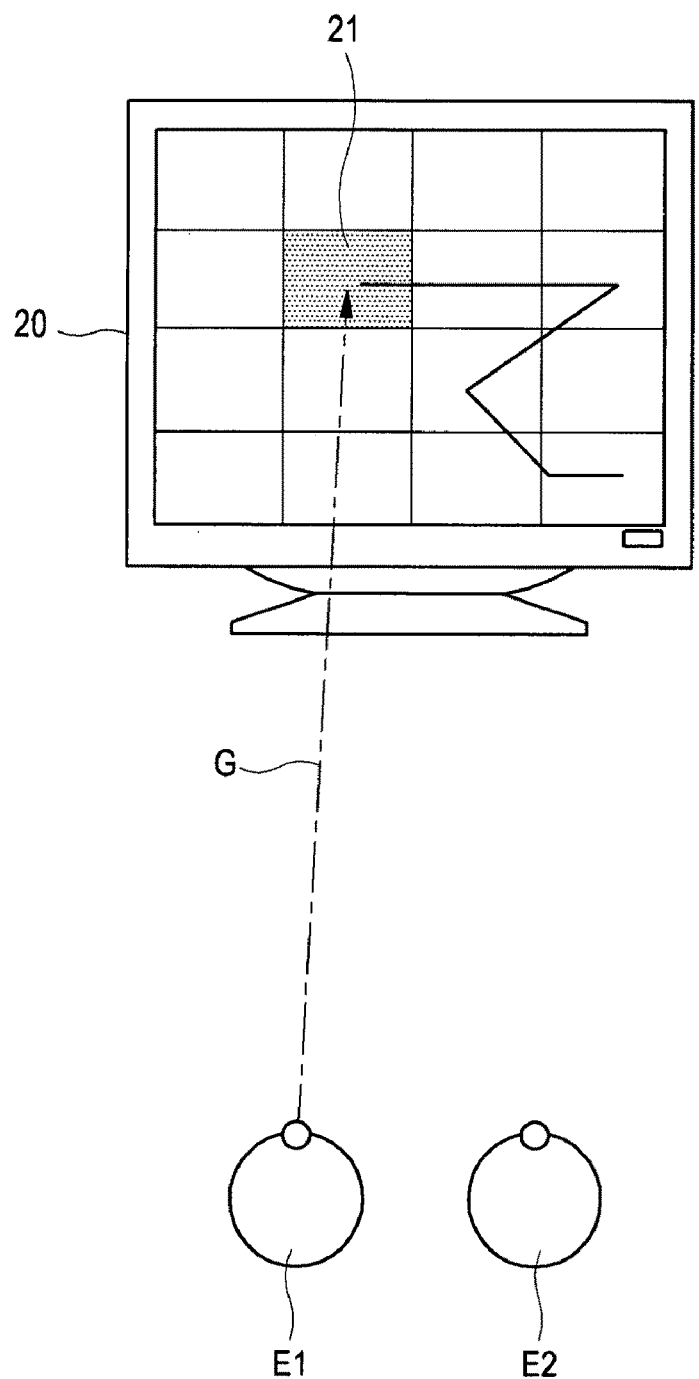
FIGS. 3 and 4 are schematic diagrams illustrating gaze direction for obtaining information on the position of an object on a two dimensional image.
Figure 4:
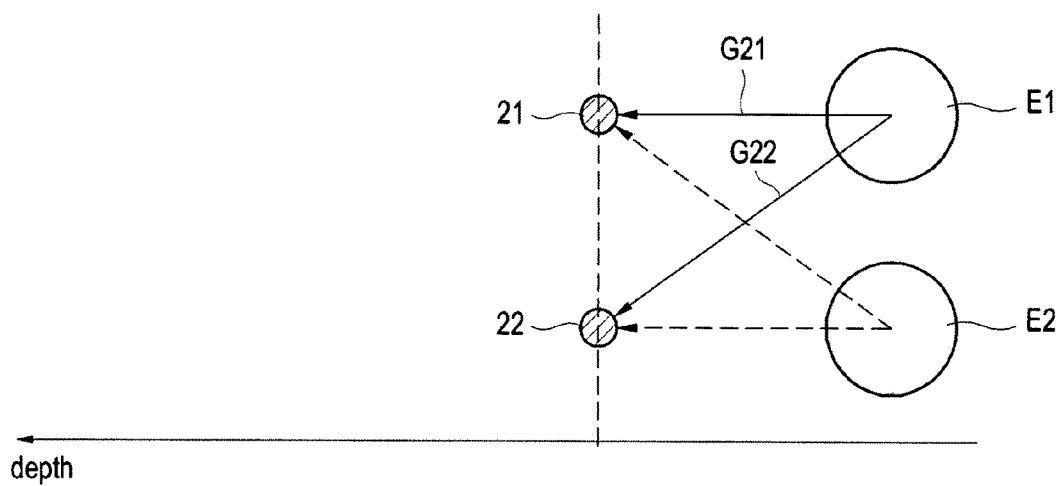
Figure 5:
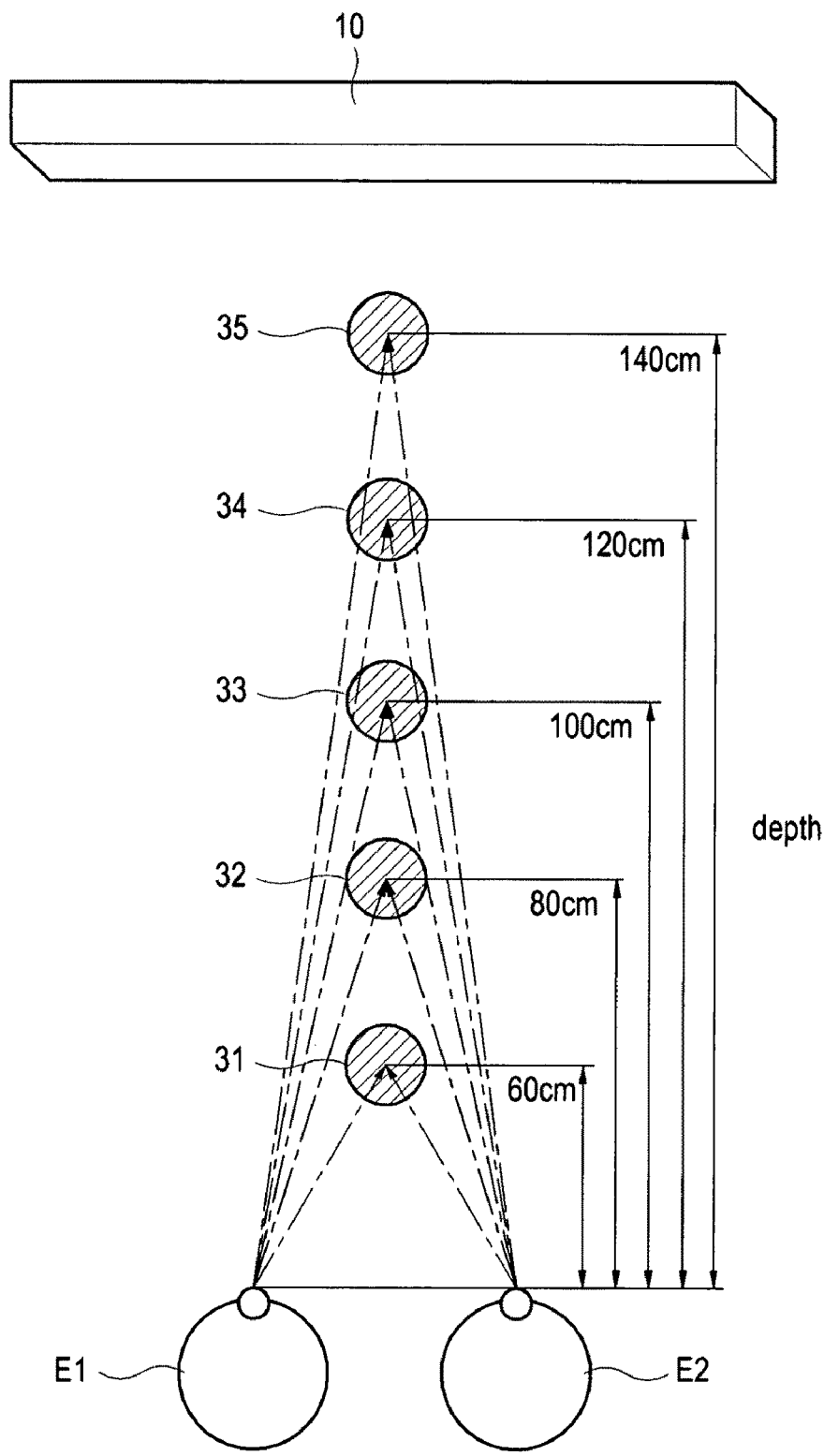
FIGS. 5 and 6 are schematic diagrams illustrating gaze direction and gaze depth for obtaining information on the position of an object on a three-dimensional image.
Figure 6:
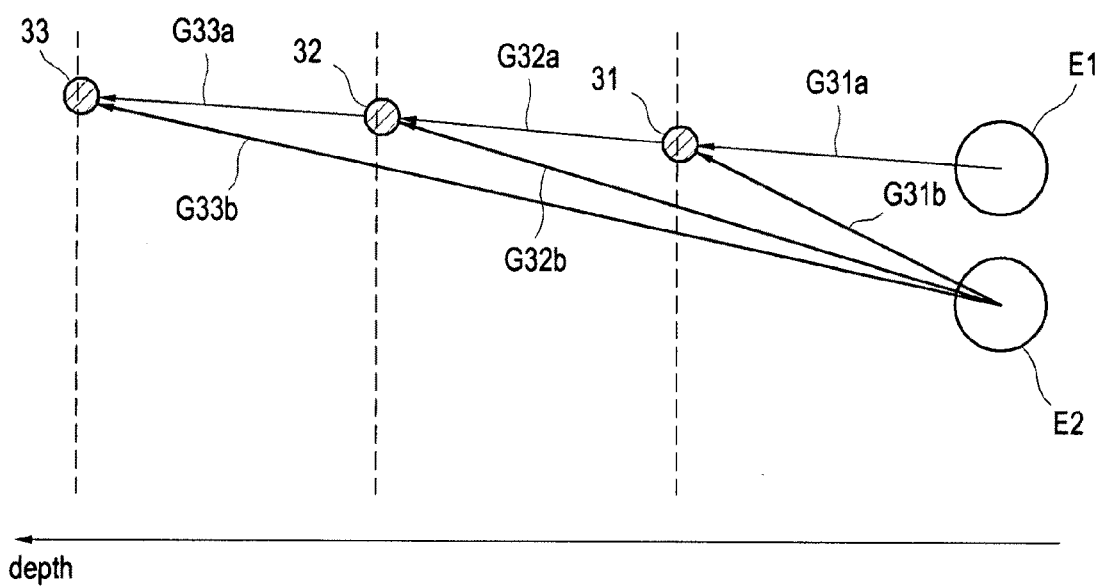

Hereinafter, the present invention will be described in more detail with respect to FIGS. 3 to 32. When an operator gazes at an object on a two-dimensional (2D) image, it is possible to find out that the operator is gazing at an object 21 on a 2D image with only the gaze direction of one eye E1 or E2 of the operator as shown in FIGS. 3 and 4. This is because all objects on a 2D image provided by a 2D image display unit 20 have the same depth. In other words, if gaze direction G1 or G2 of one eye E1 of the operator is known (see FIG. 4), it is possible to find out that the operator is gazing at the object 21 or 22 on the 2D image. However, objects 31 to 35 on a 3D image provided by the display unit 10, as shown in FIGS. 5 and 6, have different depths depending on their positions and, thus, it is only possible to find out the object that the operator is gazing at if you have information regarding the gazes of both eyes of the operator E1 and E2. In FIG. 6, the reference symbols "G31a" and "G31b" denote gazes of each eyes E1 and E2 on the object 31, while "G32a" and "G32b" denote gazes of each eyes E1 and E2 on the object 32 and "G33a" and "G33b" denote gazes of each eyes E1 and E2 on the object 33, respectively. Therefore, in the case of a 3D image having objects with different depths, it is possible to find out the object that the operator is gazing at by using the gazes of both eyes.

Figure 7:
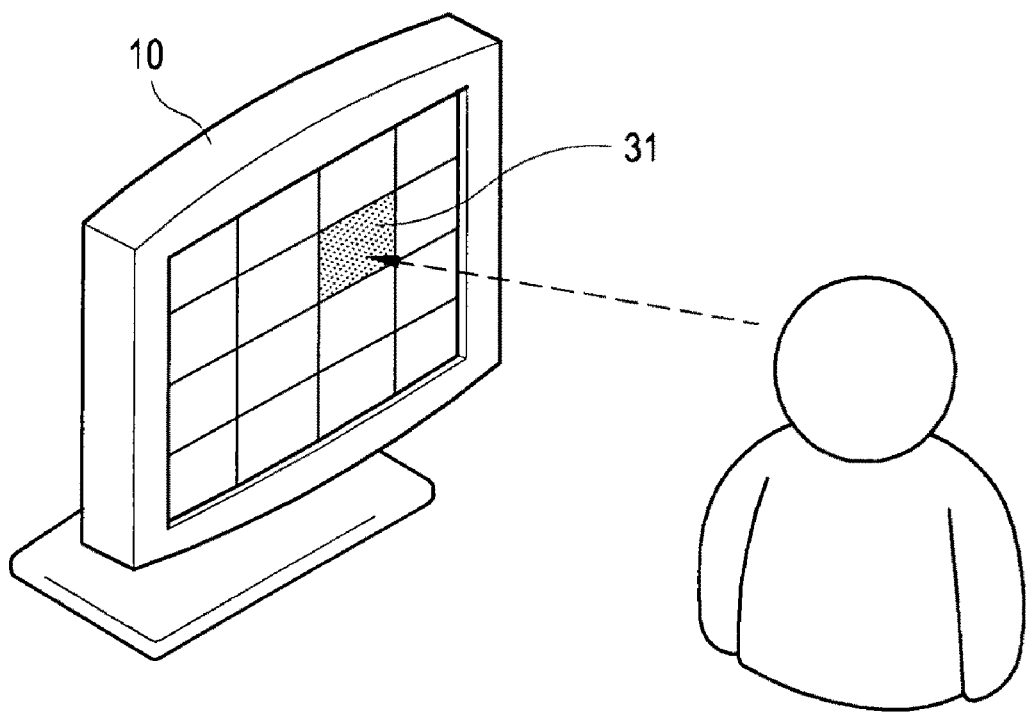
FIG. 7 is a schematic diagram illustrating a situation where the user gazes at an object on a three-dimensional image.
Figure 8:
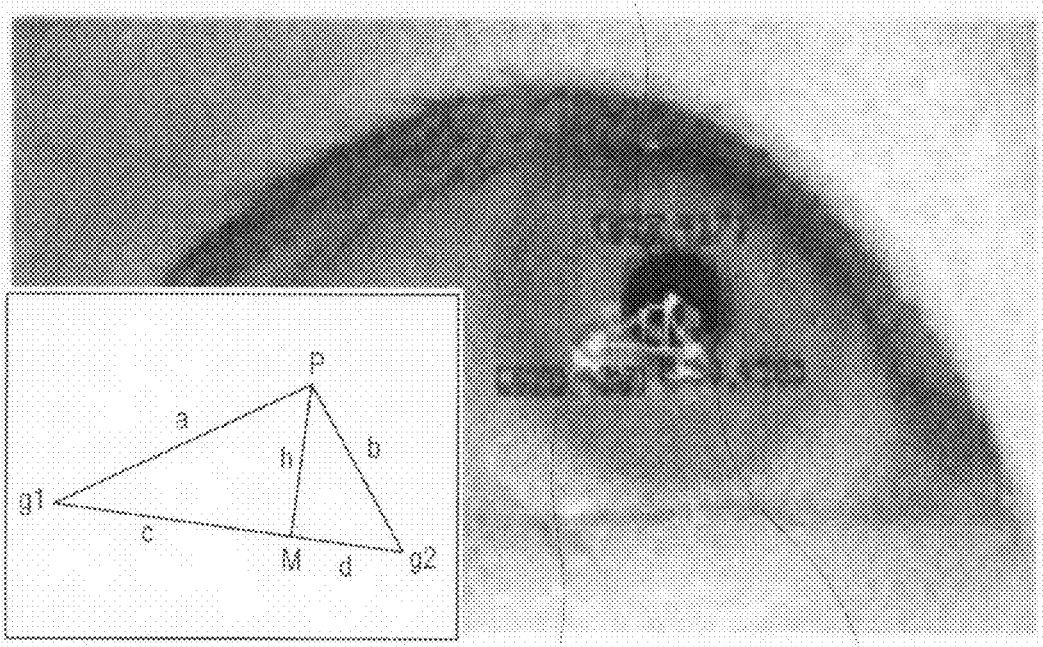
FIG. 8 is a schematic diagram illustrating a method of determining the gaze direction by using a photographic image of the user's eyes taken in the situation shown in FIG. 7.
Figure 9:
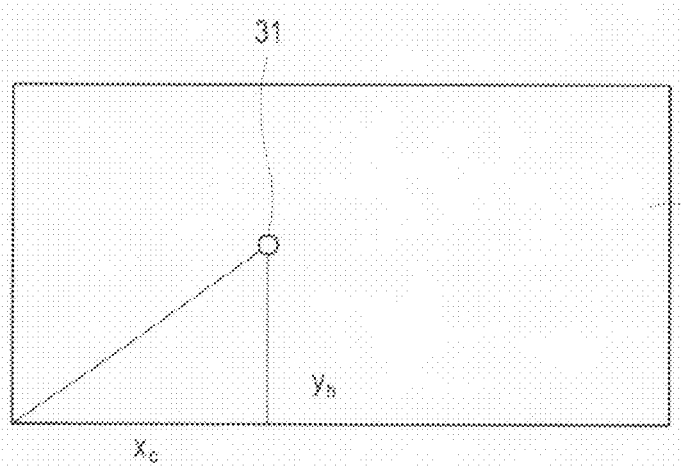
FIG. 9 is a diagram illustrating a method of determining the gaze direction of the user with respect to the object in accordance with an embodiment of the present invention.
Figure 10:
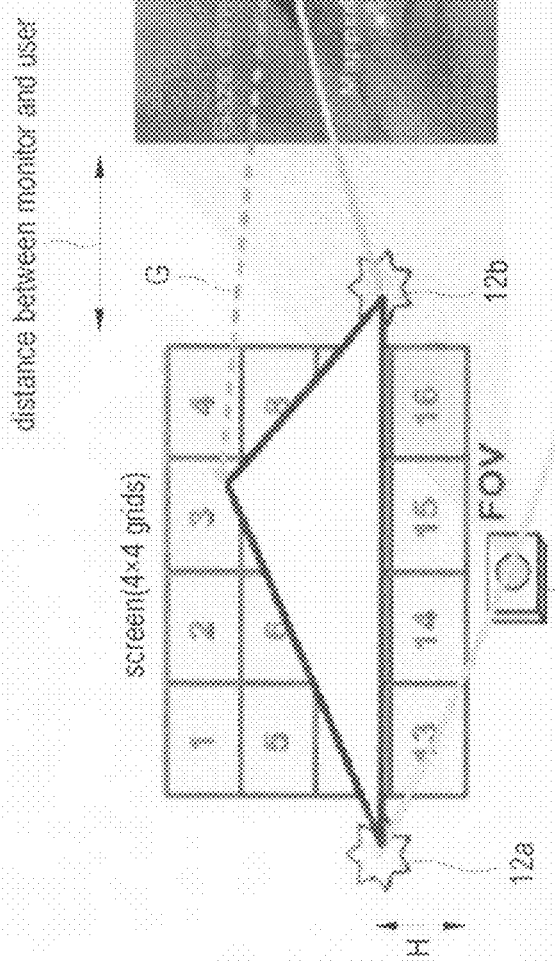
FIG. 10 is a schematic diagram showing the relationship between glints on an eye image and infrared light sources and the relationship between the gaze, the center point of the pupil, and the view point on a screen at the time of determining the gaze direction in accordance with an embodiment of the present invention.

FIG. 7 schematically illustrates a situation where an operator gazes at the object 31 on a 3D image provided by the display unit 10. FIG. 8 is a schematic diagram showing a photographic image of the operator's eyes captured at the situation shown in FIG. 7 with a camera and illustrating the method of determining the gaze direction. The image shows two glints g1, g2 on one eye of the operator (see FIG. 8), which are caused by the two infrared light sources included in the gaze-based 3D interaction system, as mentioned above. The reference symbols g1 and g2 refer to the outer glint and inner glint, respectively. Considering that the center point P of the pupil and the two glints g1, g2 are the three vertices of a triangle, the vertical distance h, measured from the center point P of the pupil to line g1g2, and the horizontal distance c, measured from the outer glint g1 to the intersection point M between line g1g2 and the vertical line starting from the center point P to the line g1g2, can be used to determine the gaze direction of the operator, who gazes at the object 31 on a screen, i.e., the display unit 10. FIG. 9 illustrates a method of determining the gaze direction of the operator, who gazes at the object 31 on a 3D image I, using the horizontal distance c between the glint g1 to the intersection point M and the vertical distance h. In FIG. 9, reference symbols "$x_c$" and "$y_h$" correspond to the horizontal distance c and the vertical distance h, respectively. FIG. 10 shows the relationship between the glints on the eye image and infrared light sources 12a and 12b, as well as the relationship between the gaze, center point P of the pupil and the view point on a screen at the time of determining the gaze direction.

Figure 11:
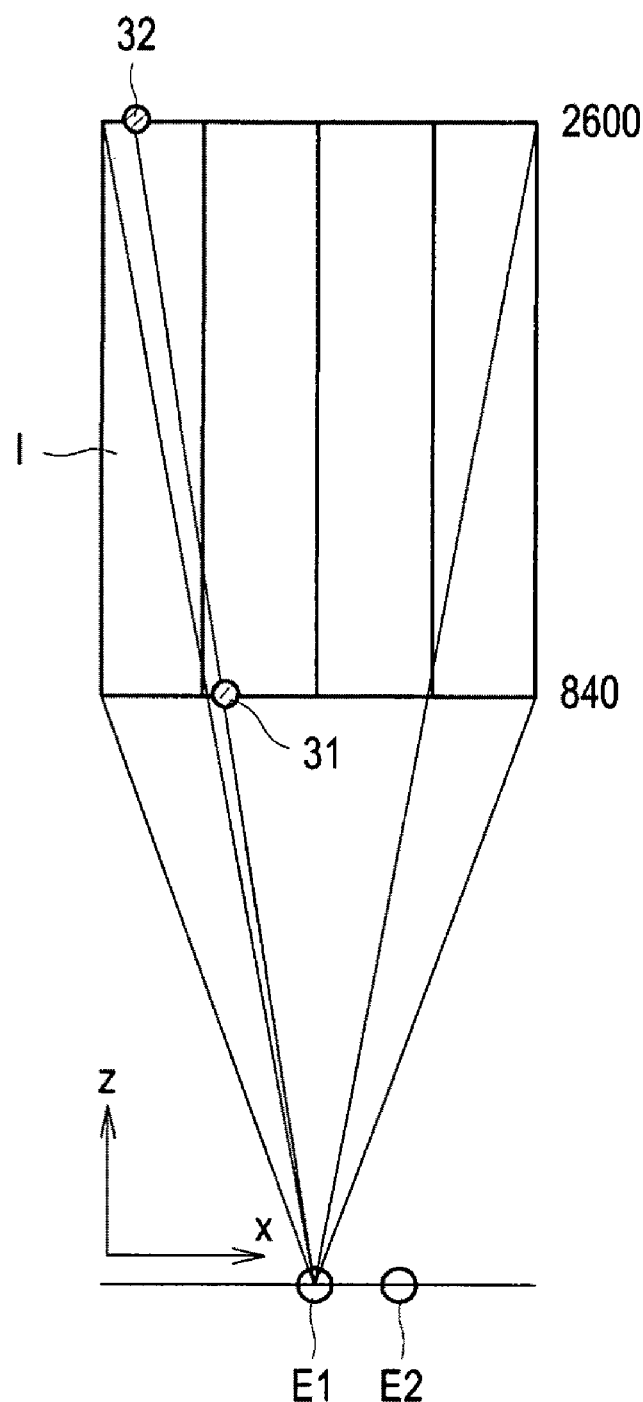
FIGS. 11, 12, and 13 are the plan view, side view and perspective view, respectively, of the three-dimensional gaze determined by the horizontal distance c and the vertical distance h.
Figure 12:
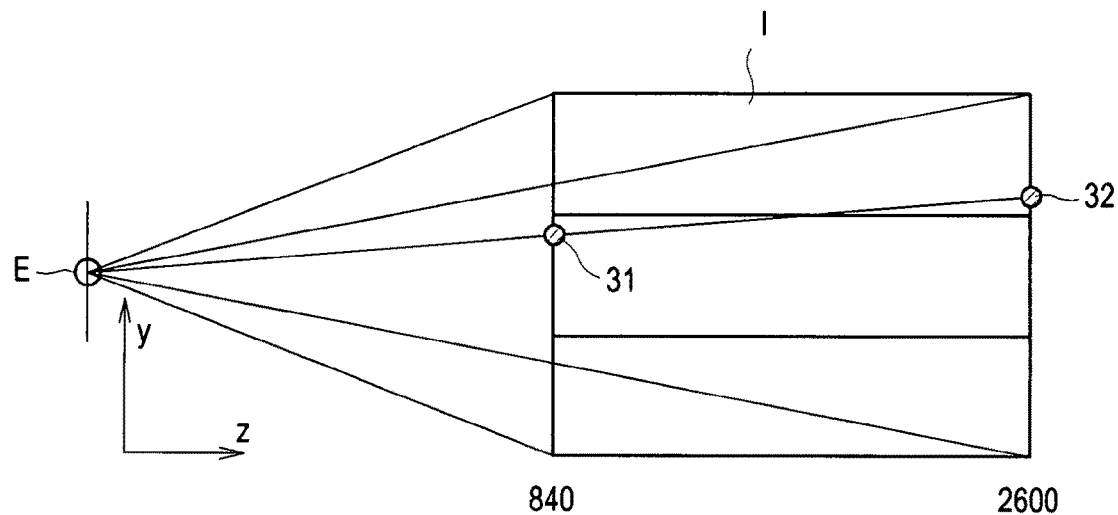
Figure 13:
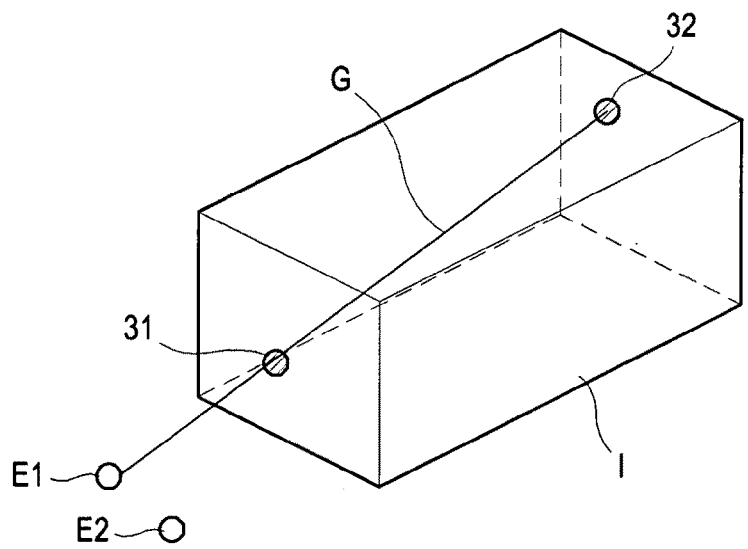

FIGS. 11 and 12 are a plan view and a side view, respectively, showing the operator's horizontal gaze and vertical gaze on the 3D image I with the horizontal distance c and the vertical distance h. FIG. 13 is a perspective view showing the 3D gaze direction ultimately determined by the method shown in FIGS. 11 and 12.

Figure 14:
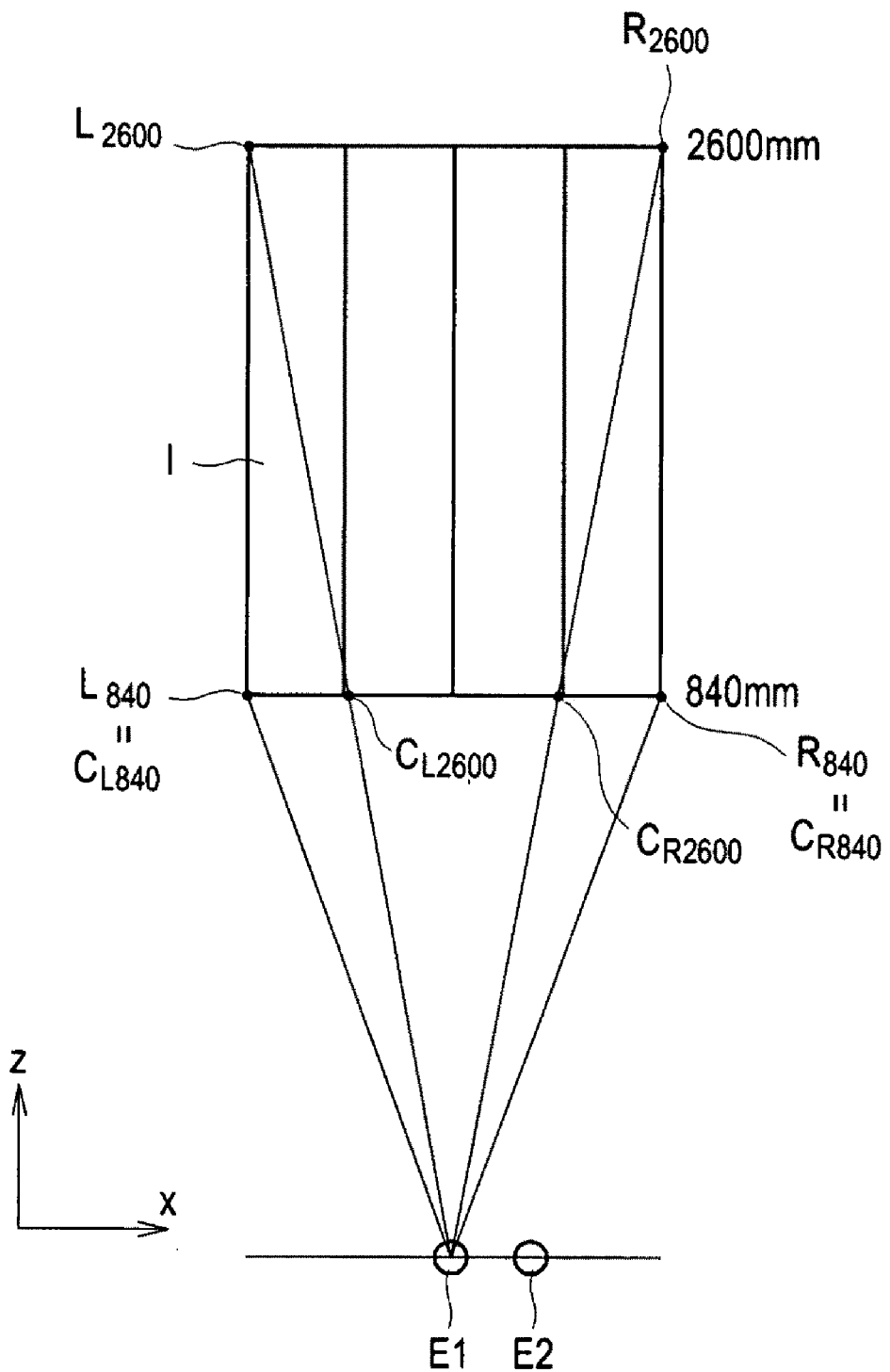
FIGS. 14 to 16 are schematic diagrams showing the process for deducing the three-dimensional gaze direction from an arbitrary value of the horizontal distance c.
Figure 15:
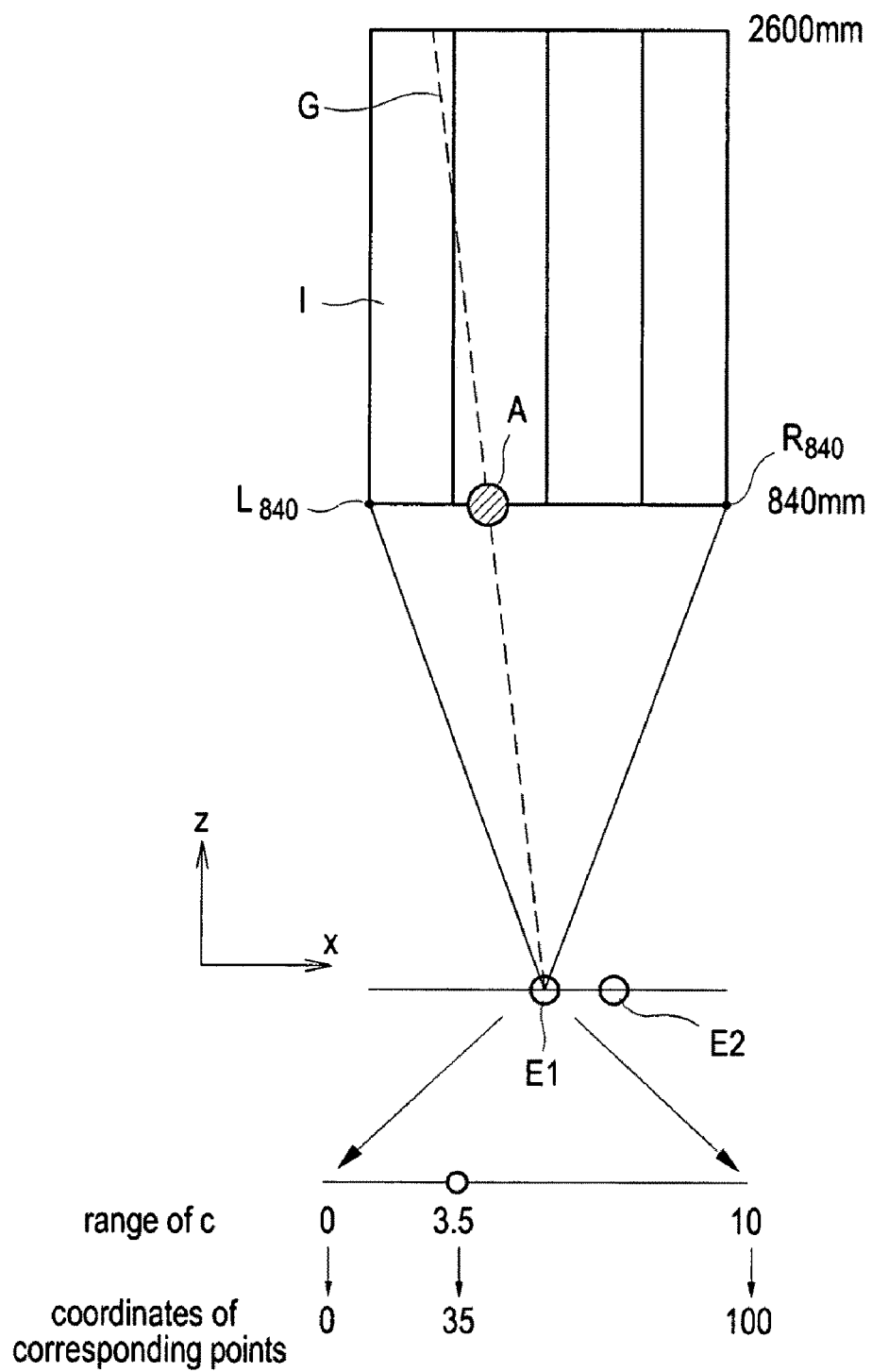
Figure 16:
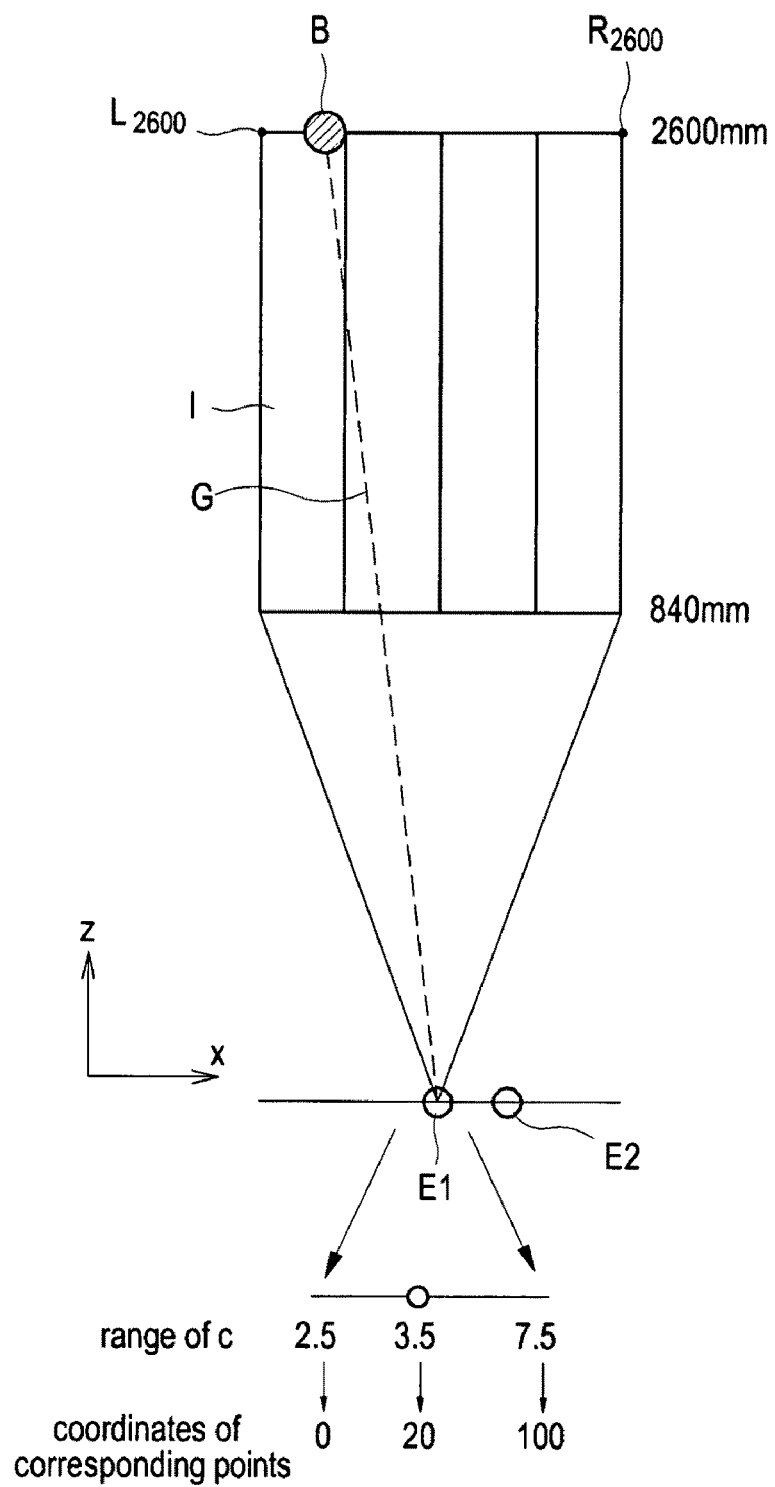

FIGS. 14 to 16 are schematic diagrams showing processes for deducing the 3D gaze direction from the arbitrarily determined horizontal distance c. FIG. 14 shows that the gaze direction and the horizontal distance c vary when the operator gazes at the left and right end points of the monitors, which are at distances of 840 mm and 2600 mm, respectively, from the operator. Namely, the horizontal distances c with respect to the left end point $L_{840}$ and the right end point $R_{840}$ of the monitor at a distance of 840 mm from the operator are "$C_{L840}$" or "$C_{R840}$", respectively, while the horizontal distances c with respect to the left end point $L_{2600}$ and the right end point $R_{2600}$ of the other monitor at a distance of 2600 mm from the operator are "$C_{L2600}$" or "$C_{R2600}$", respectively.

Referring to FIGS. 15 and 16, which show that the distances between the operator and the respective monitors are 840 mm and 2600 mm, if point A on the monitor at a distance of 840 mm from the operator and point B on the other monitor at a distance of 2600 mm from the operator are located on the same gaze G of the operator, the horizontal distances c obtained from the eye images, are identical. For example, the horizontal distances c for points A and B are both 3.5. If it was known by previously performed calibration that the horizontal distances c corresponding to the left end point $L_{840}$ and the right end point $R_{840}$ on the monitor at a distance of 840 mm from the operator is 0 and 10, respectively, as shown in FIG. 15, and the horizontal distances c corresponding to the left end point $L_{2600}$ and the right end point $R_{2600}$ on the other monitor at a distance of 2600 mm is 2.5 and 7.5, respectively, the horizontal coordinates for points A and B on monitors at distances of 840 mm and 2600 mm when each monitor has the same width of 100, become 35 and 20, respectively. The vertical coordinates of the points can be obtained using the same method as the above mentioned method of obtaining the horizontal coordinates.

Figure 17:
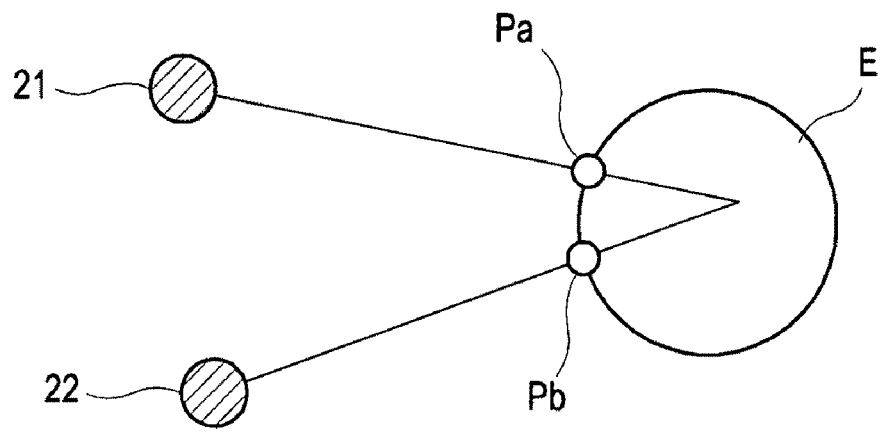
FIGS. 17 to 19 are schematic diagrams for illustrating the variation in gaze depth according to the distance between the pupils.
Figure 18:
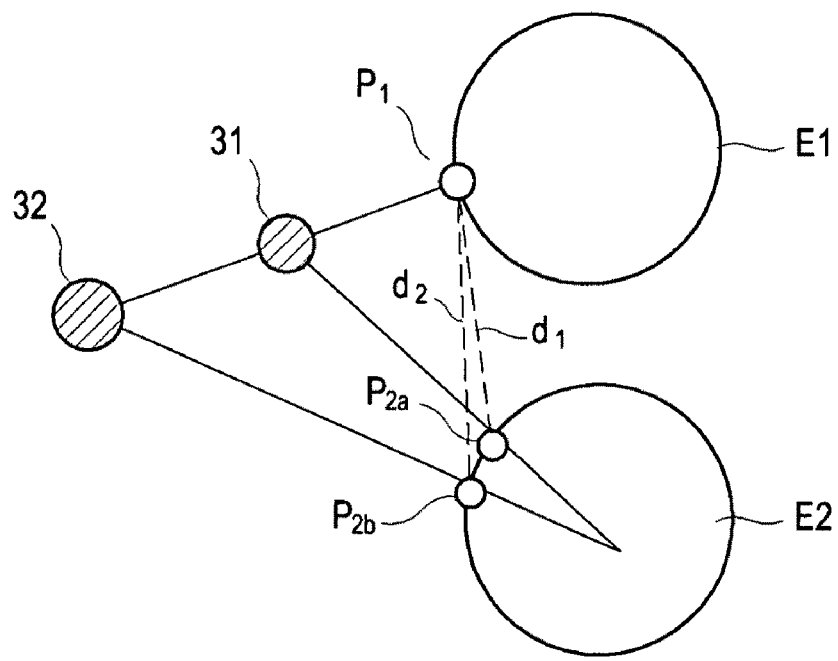
Figure 19:
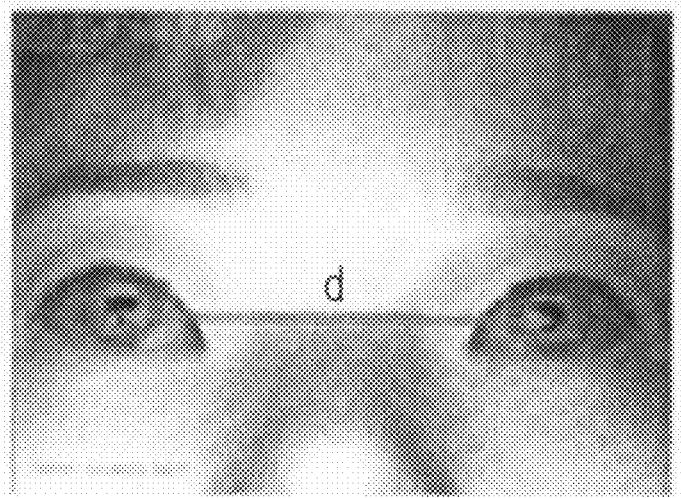
Figure 20:
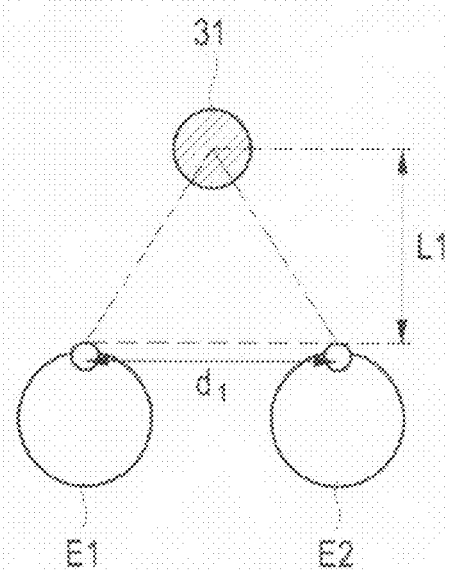
FIGS. 20 and 21 are diagrams showing the variation in gaze depth according to the distance between the pupils.
Figure 21:
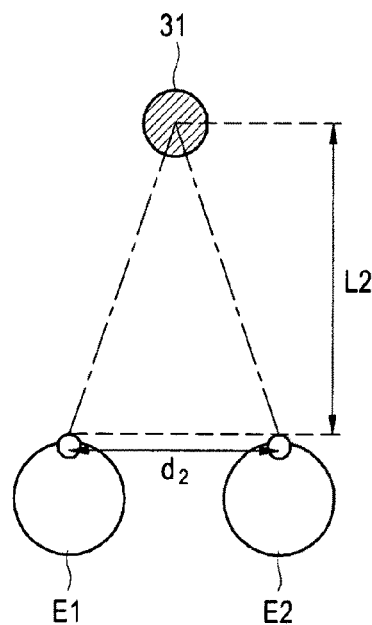
Figure 22:
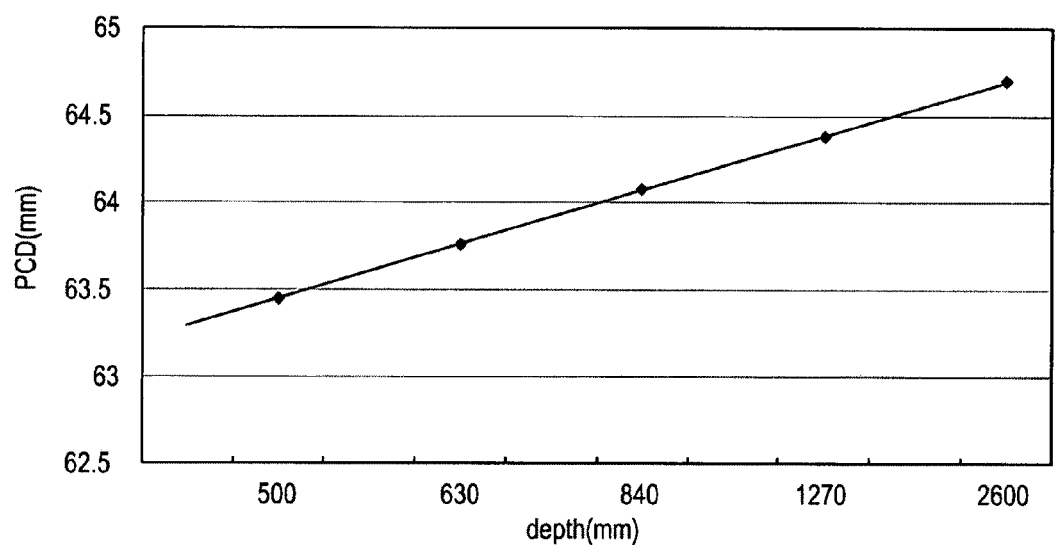
FIG. 22 is a graph illustrating the variation in gaze depth according to the distance between the pupils.

Referring to FIG. 17, when the operator gazes at the object 21 on a 2D image, the gaze depth is constant regardless of the position of the object, and only the positions of the pupils change. However, as shown in FIG. 18, the gaze depth varies according to the positions of the objects 31 and 32 on a 3D image, and therefore gaze direction is determined along the gaze direction of the one eye E1 and gaze depth is determined by the distance between the pupils of both eyes E1 and E2. In other words, when the operator gazes at the object 31 and object 32, which are located on the same gaze direction, one after another, the position of the pupil in the one eye E2 is changed from P2a to P2b, and the distance between the pupils of both eyes is also changed from d1 to d2. FIG. 19 is a photographic image showing an example of measuring the distance d between the pupils from an image of both eyes of the operator. Preferably, the distance d between the pupils is the distance between the centers of the two pupils. FIGS. 20 and 21 are diagrams showing the variation in gaze depths according to the distance between the pupil centers, as well as the relationship between the pupil distances (d1<d2; when d1 is smaller than d2) and the gaze depths (L<L2; when L1 is smaller than L2). FIG. 22 is a graph showing the variation in gaze depths according to the distance between pupil centers (hereinafter, referred as PCD) where a linear relation between PCD and the gaze depth is shown.

Figure 23:
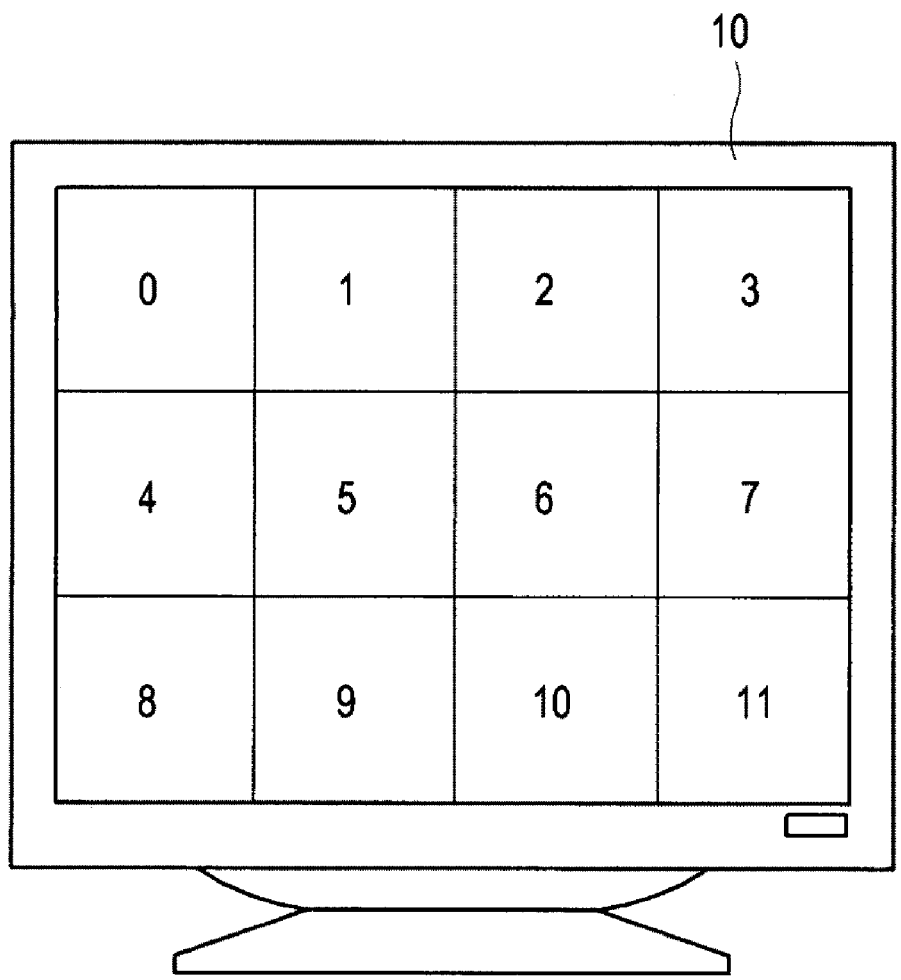
FIG. 23 is a schematic diagram illustrating the division of the three-dimensional image into twelve regions having the same depth.
Figure 24:
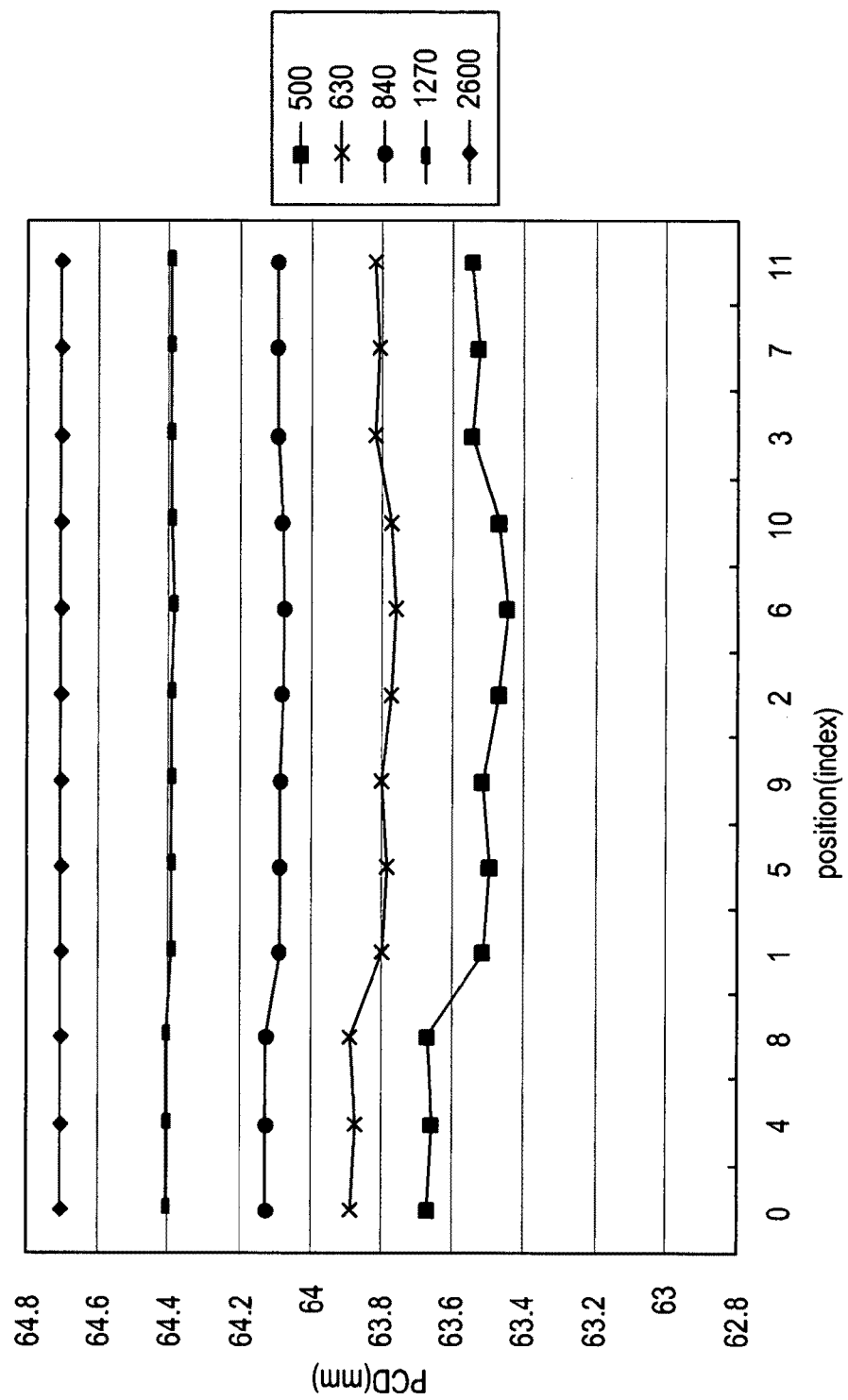
FIG. 24 is a graph showing the variation in the PCD values in each region according to the distance between the monitor and the user.
Figure 25:
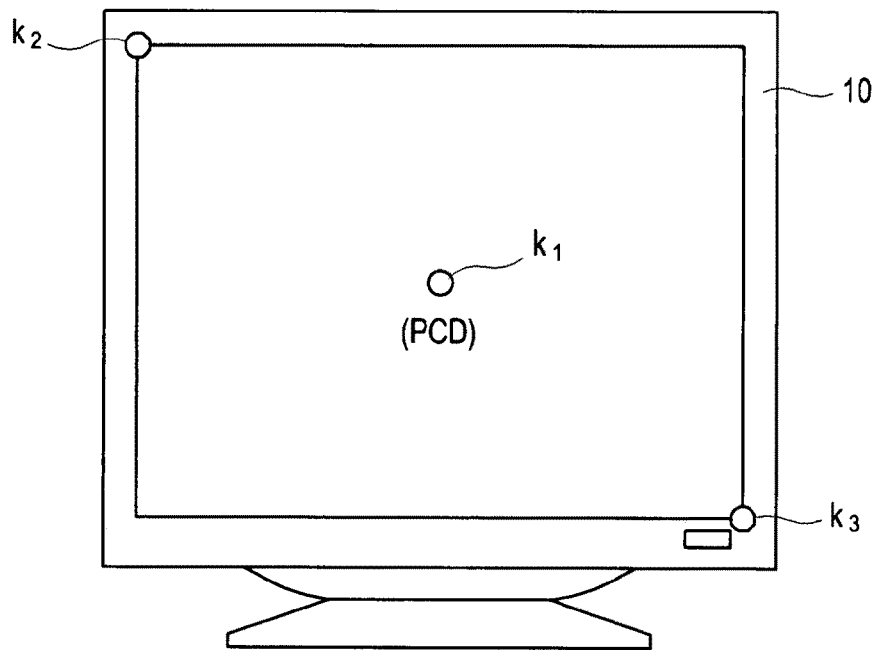
FIGS. 25 and 26 are diagrams showing the positions of target points selected for calibration.
Figure 26:
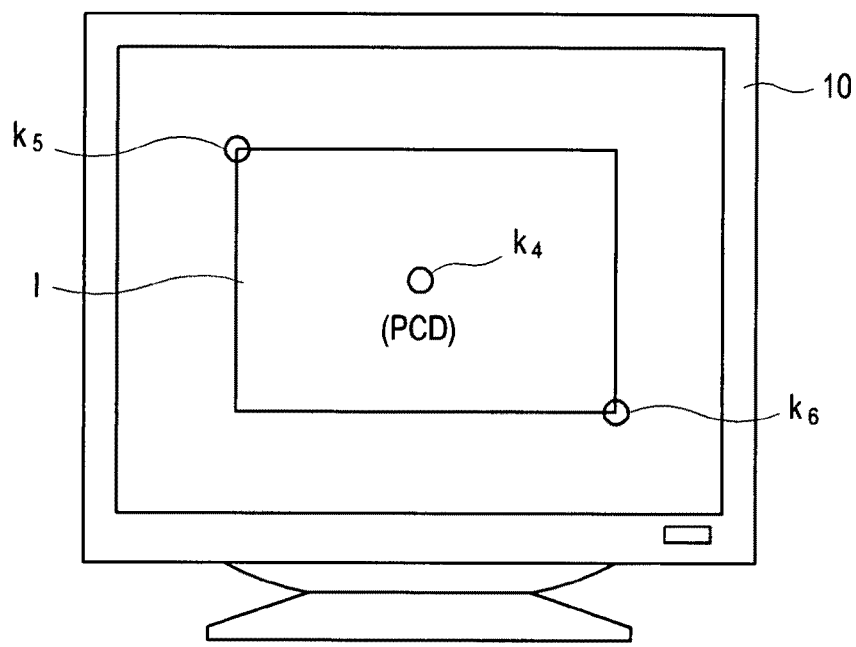

Referring to FIG. 23, when a 3D image displayed on the display unit 10 is divided into twelve regions (from region 0 to region 11) having the same depth, the PCD of each region is a function of the distance between the monitor and the operator and is within a relatively constant range, as shown in FIG. 24. Accordingly, a PCD calibrated at a specific depth may be used for obtaining PCDs at other depths by interpolation without having to calibrate the PCDs at all depths. Referring to FIG. 25, the operator gazes at a center point K1 and two vertices K2 and K3 on a 3D image, one after another, for calibration. The center point K1 and two vertices K2 and K3 are located on the same diagonal line. The values of c, h and PDC at each vertex K2 and K3 are obtained and the PDC with respect to the center point K1 is obtained. In FIGS. 25 and 26, the distances between the display units 10 and the operator are 840 mm and 2600 mm, respectively. As shown in FIG. 26, if the monitor is located at a far distance, the 3D image corresponding to the size of the monitor appears relatively small. This is because of the same principle that an object at a far distance appears relatively small. Also, in the case where the distance between the display unit 10 and the operator is large, as shown in FIG. 26, the operator gazes at a center point K4 and two vertices K5 and K6 on an 3D image I, one after another, for calibration. The values of c, h and PDC at each vertex K5 and K6 are obtained and the PDC with respect to the center point K4 is obtained. As mentioned above, the PCDs of three points at the depths of 840 mm and 2600, are calibrated and the PCDs at other depths are obtained by interpolation. FIG. 27 shows the calibrated c, h and PCD values for the two operators. The PCDs at other depths may be obtained by interpolation using the calibrated PCD. As such, a PCD value at one depth is calibrated for each operator at once, and the calibrated PCD value is used to obtain other PCDs at other depths.

Figure 28:
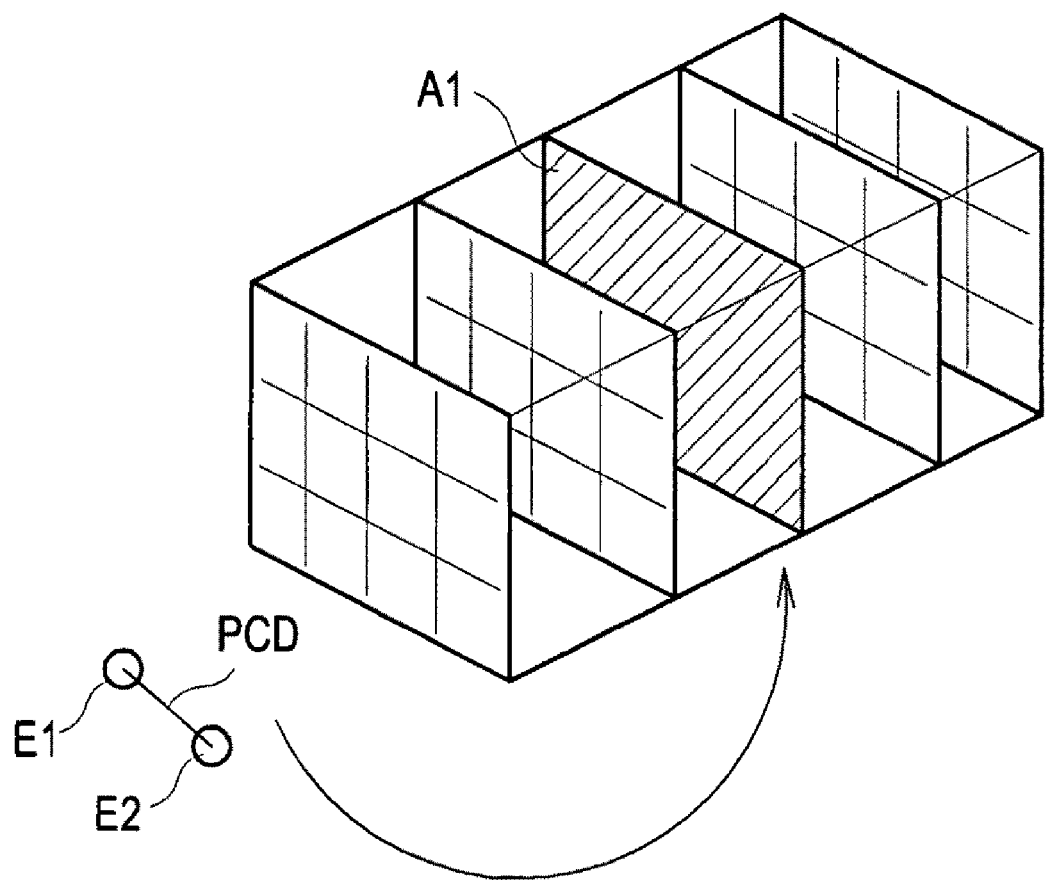
FIGS. 28 and 29 are conceptual diagrams showing the determination of a gaze target region on the three-dimensional image using the gaze direction and depth.
Figure 29:
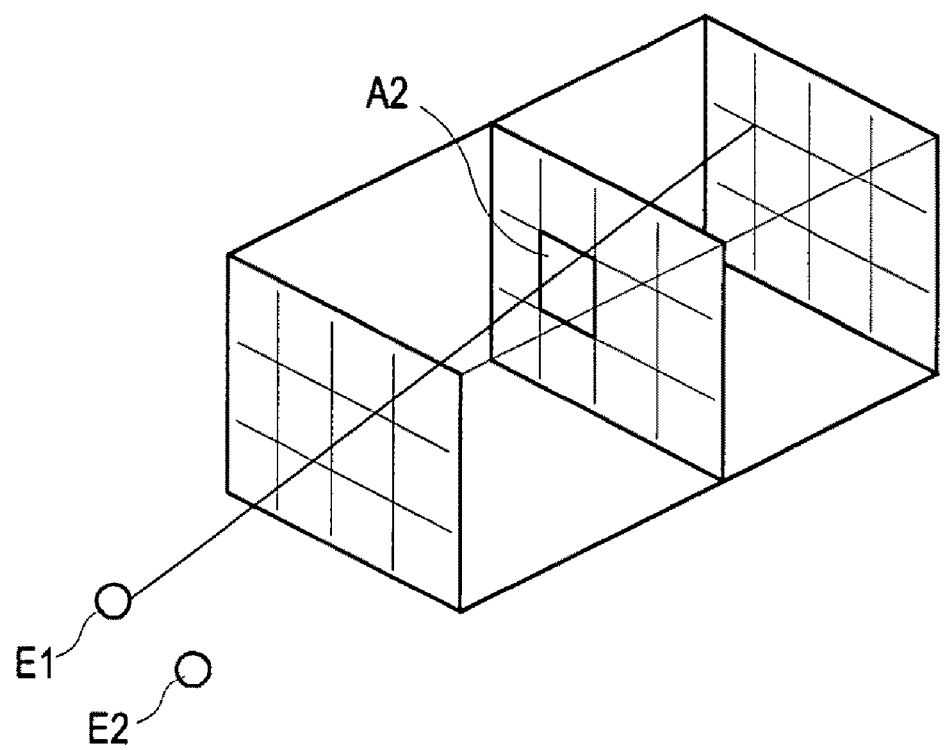

FIGS. 28 and 29 are conceptual diagrams showing the determination of a gaze target region on the 3D image using gaze direction and gaze depth. Referring to FIG. 28, the distance between pupil centers, i.e. PCD, is first calculated and then a region A1 at one depth may be selected based on the calibrated PCD. Referring to FIG. 29, a gaze target region A2 on the 3D image may be finally determined using the gaze direction and gaze depth in 3D.

Figure 30:
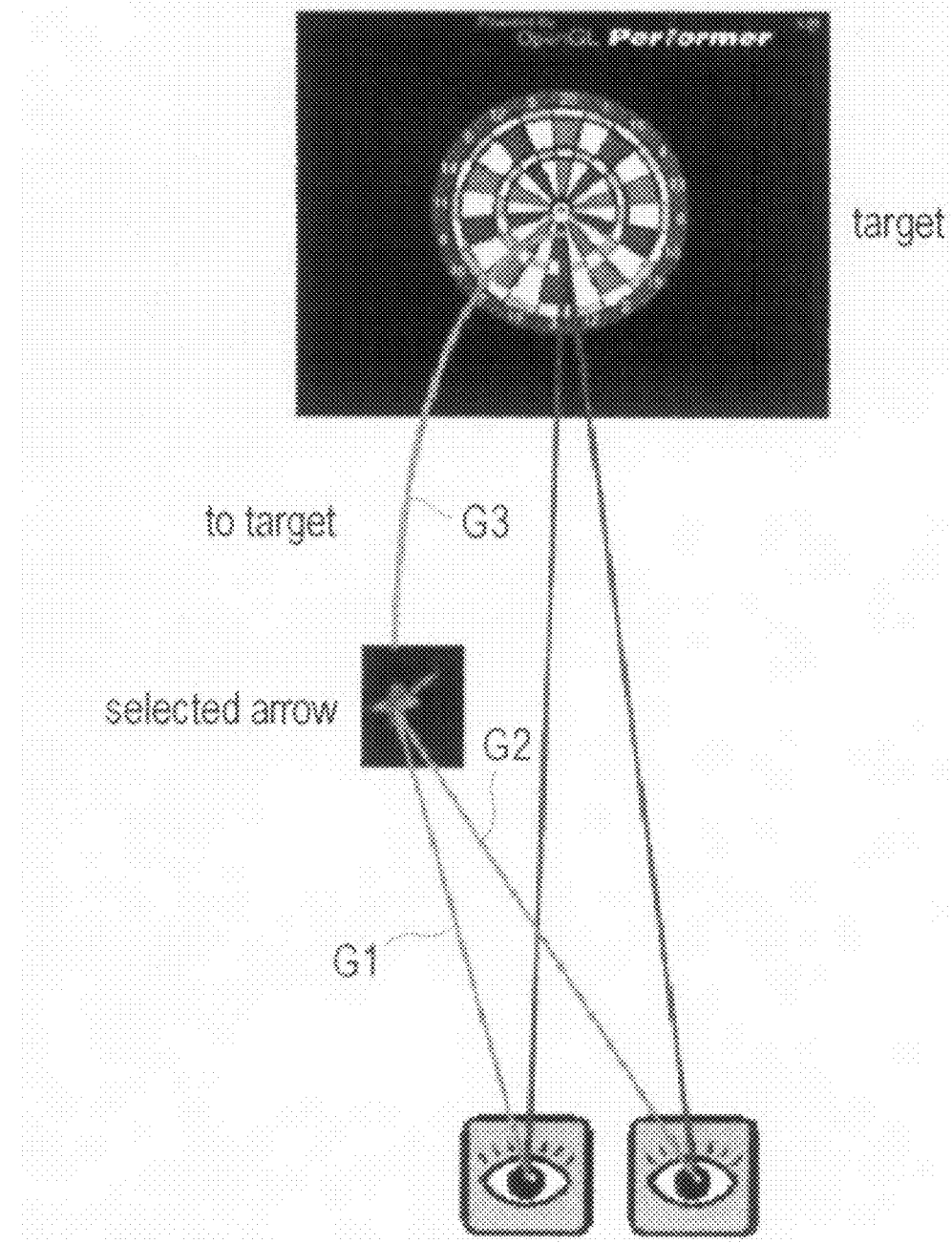
Figure 31:
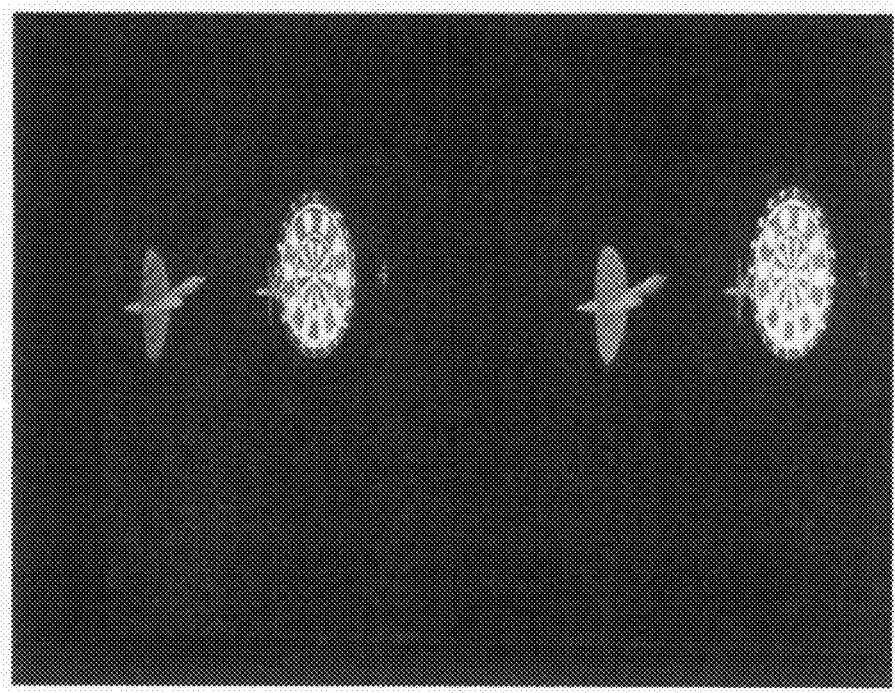

FIG. 30 to 32 shows an embodiment of playing darts as an example of the gaze-based 3D interaction in accordance with the present invention. Referring to FIG. 30, an operator may select an arrow at a short distance on a 3D image with gazes G1 and G2 of both eyes. The operator may change his/her gazes G1 and G2 into G3 and G4 to select a target at a long distance on the 3D image. As a result, the selected arrow may fly to the target. FIG. 32 shows the 3D interaction system 100 with which the gaze-based 3D interaction has been performed, as well as a monitor 15 for monitoring the process of determining the gaze direction and depth.

The gaze-based 3D interaction system and the 3D gaze tracking system according to the present invention may be configured by adding two infrared light sources and a camera to a conventional personal computer (PC). Therefore, the present invention is economical to make and may be easily applied to various fields, such as education, games, movies, and marketing, which requires tracking and recording gazes and analyzing and recording interests of users and investigation. Further, since the present invention does not require the attachment of a separate device for interaction, the operator may use the system freely with little hindrance.

Further, in the gaze-based 3D interaction system and the 3D gaze tracking system in accordance with the present invention, the gaze direction may be determined by using the image of one eye of the operator, while gaze depth may be determined by the distance between pupil centers from both eyes of the operator. Therefore, the 3D gaze can be quickly determined.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A gaze-based three-dimensional (3D) interaction system, comprising:
a display unit configured to display a 3D image having objects with different depths;
two light sources respectively aligned at both sides of said display unit to provide lights;
an image capturing unit configured to capture an image of both eyes of an operator gazing at the 3D image, the image of the both eyes of the operator showing glints formed by the lights provided from said two light sources and two pupils in the both eyes;
a first signal processing unit configured to calculate a gaze direction to which the operator is gazing at the 3D image based on positions of two glints and a pupil at one of the eyes on the image of the both eyes and a gaze depth at which the operator is gazing at the 3D image based on a distance between the two pupils in the image of the both eyes;
a second signal processing unit configured to determine a gaze of the operator on said 3D image based on the gaze direction and the gaze depth; and
a third signal processing unit configured to execute a command the operator intended according to the determined gaze.

2. The system of claim 1, wherein the light sources are infrared light emitting diodes (LED).

3. The system of claim 2, wherein the image capturing unit is a digital camera having an infrared filter attached thereto.

4. The system of claim 1, wherein the second signal processing unit selects a region corresponding to a depth related to the distance between the pupils shown by the image of the operator's both eyes and determines the gaze of the operator within the selected region based on the gaze depth and the gaze direction.

5. A gaze-based three-dimensional (3D) interaction method, comprising:
displaying a 3D image having objects with different depths;
providing lights on both eyes of an operator gazing at said 3D image by using two light sources;
capturing an image of both eyes of the operator, the image of both eyes of the operator showing glints formed by the lights provided from said light sources and two pupils in both eyes;
calculating a gaze direction to which the operator is gazing at the 3D image based on positions of two glints and a pupil at one of the eyes on the image of both eyes and a gaze depth at which the operator is gazing at the 3D image based on a distance between the two pupils in the image of the both eyes;
determining a gaze of the operator on said 3D image based on the gaze direction and the gaze depth; and
executing a command the operator intended according to the determined gaze.

6. The method of claim 5, wherein a region corresponding to a depth related to the distance between the pupils shown by the image of the operator's both eyes is selected, and the gaze of the operator is determined within the selected region based on the gaze depth and the gaze direction.

7. A three-dimensional (3D) gaze tracking system, comprising:
a display unit configured to display a 3D image having objects with different depths;
two light sources respectively aligned at both sides of said display unit to provide lights;
an image capturing unit configured to capture an image of both eyes of an operator gazing at a 3D image, the image of both eyes of the operator showing glints formed by the lights provided from the two light sources and two pupils in the both eyes;
a first signal processing unit configured to calculate a gaze direction to which the operator is gazing at the 3D image based on positions of two glints and a pupil at one of the eyes on the image of the both eyes and a gaze depth at which the operator is gazing at the 3D image based on a distance between the two pupils in the image of the both eyes; and
a second signal processing unit configured to determine a gaze of the operator on said 3D image based on the gaze direction and the gaze depth.

8. The system of claim 7, wherein the light sources are infrared light emitting diodes (LED).

9. The system of claim 8, wherein the image capturing unit is a digital camera having an infrared filter attached thereto.

10. The system of claim 7, wherein the second signal processing unit selects a region corresponding to a depth related to the distance between the pupils shown by the image of the operator's both eyes and determines the gaze of the operator within the selected region based on the gaze depth and the gaze direction.

11. A three-dimensional (3D) gaze tracking method, comprising:

displaying a 3D image having objects with different depths;

providing lights on both eyes of an operator gazing at said 3D image by using two light sources;

capturing an image of both eyes of the operator showing glints formed by the lights provided from said two light sources and two pupils in the both eyes;

calculating a gaze direction to which the operator is gazing at the 3D image based on positions of two glints and a pupil at one of the eyes on the image of the both eyes and a gaze depth at which the operator is gazing at the 3D image based on a distance between the two pupils in the image of the both eyes; and tracking a gaze of the operator on said 3D image based on the gaze direction and the gaze depth.

12. The method of claim 11, wherein a region corresponding to a depth related to the distance between the pupils shown by the image of the operator's both eyes is selected, and the gaze of the operator is tracked based on the gaze depth and the gaze direction.

* * * * *